United States Patent Office 2,957,080
Patented Oct. 18, 1960

2,957,080

METHOD AND MEANS FOR RADIATION DOSIMETRY

John W. Schulte and John F. Suttle, Los Alamos, N. Mex., assignors to the United States of America as represented by the United States Atomic Energy Commission No Drawing. Original application Aug. 4, 1953, Ser. No. 382,495, now Patent No. 2,824,234, dated Feb. 18, 1958. Divided and this application Sept. 13, 1957, Ser. No. 683,915

7 Claims. (Cl. 250—83)

This invention relates to the measurement of ionizing radiation, and more particularly, to the provision of an effective and convenient radiation dosimeter. This applicaiton is a division of the applicants' co-pending application, Serial No. 382,495, filed August 4, 1953, for a Method and Means for Radiation Dosimeter, now Patent 2,824,234, issued February 18, 1958.

The problem of measuring dosages of radiation is an old one, dating back to the early work of Roentgen, Becquerel, and the Curies. However, such problems have, in the past, been confined to relatively few persons and exposures, and were therefore susceptible of handling by complicated, delicate and inconvenient means. The need for providing entire populations with convenient and stable dosimeters in the interest of national security is a new one, and cannot be met through use of prior art devices.

It is therefore an object of this invention to provide a dosimeter for ionizing radiation.

It is another object of this invention to provide an ionizing radiation dosimeter which is convenient and simple.

It is a further object of this invention to provide a novel means of determining dosages of radiation.

Still further objects include means for preparing materials to be employed in radiation dosimetry.

Other objects and advantages of this invention will become apaprent from the disclosure which follows.

The objectives of this invention are achieved through utilization of newly discovered principles and methods, namely, that when appropriate variables are controlled, the response of certain halogenated materials to radiation can be utilized to determine with accuracy the amount of radiation to which the materials have been exposed.

It has been long known that many materials are decomposed by radiation to yield products easily detected and measured. In particular, Clover, Journal of the American Chemical Society, volume 45, pages 3133–3138 (1923), and Gunther et al., Zeitschrift für Elektrochemie, volume 34, pages 616–625 (1928), have published results of their work on chlorinated materials such as chloroform. Their publications typify the lack of consistency available before the discoveries of the present invention. Results in earlier work have varied with variations in sources of materials, and in methods and equipment employed, to an extent that no useful dosimetric systems and devices could be developed to take advantage of the radiation response of, e.g., chloroform. Because of the non-penetrating nature of ionizing radiation other than gamma rays, this disclosure is, as is the art in general, effectively limited to gamma or X-radiation.

It has been discovered that, when halogenated materials are rigorously purified and when there are present only controlled amounts of certain classes of materials, there can be manufactured devices with reproducible response to radiation. While the exact details of the mechanisms of reaction have not yet been completely elucidated, the following discussion is presented in an attempt to make more clear the nature of the instant invention. No limitation in the invention is thereby intended.

When radiation interacts with, for example, a rigorously pure system containing as the only reactive material a halogenated hydrocarbon such as chloroform, bromoform, tetrachloroethane or 1,1,2-trichloroethane, the organic compound has been found to dissociate into fragments which rapidly recombine, for the most part, to regenerate the original material or to form a related hydrocarbon derivative. Some quantity of other materials may also be formed, and detection and estimation of these materials may then give information on the amount of radiation to which the organic material has been exposed. If there are present materials which are reactive to these dissociated fragments, the amount of fragments remaining in identifiable form can be changed markedly. If there is present material which shows a high affinity for such fragments, in reactions which absorb and destroy the identity of the fragments, then little or no indication remains of a radiation-induced reaction in the halogenated hydrocarbon. Among such "desensitizing" materials, hydroxy compounds are known to inhibit radiation-induced reactions in halogenated hydrocarbons. Ethyl alcohol is added to commercial chloroform to reduce its decomposition, e.g., in sunlight. Other alcohols and phenols are similarly effective, as are some other materials.

On the other hand, "sensitizing" materials can enhance the effect of radiation-induced dissociations to a point where ready estimation would be possible. It has been found that the use, in halogenated hydrocarbon systems exposed to radiations, of controlled amounts of such materials as oxygen, benzoyl peroxide, sodium peroxide, nitrobenzene, and others, enables ready and reproducible estimation of the amount of radiation involved.

The process of our invention therefore comprises purifying the radiation sensitive material, i.e., the halogenated hydrocarbon, to remove such agencies as "sensitizers" or "desensitizers," supplying controlled amounts of one or more "sensitizers," maintaining controlled conditions, and estimating the extent of reaction after exposure to radiation. Another aspect of our process includes controlling both the amount and the time of addition of the sensitizing material, so that the desimetric system can respond only to the desired radiation and not, over a long period of time, to such "background" as visible or cosmic radiation.

A typical example of our method is here given, using chloroform and oxygen as pertinent materials.

Chloroform from commercial sources is successively vigorously agitated with and then separated from equal volumes of fuming sulfuric acid (two times), distilled water, a saturated aqueous solution of sodium bicarbonate, and distilled water (two times). The purified chloroform is then dried by an inert drying agent such as an anhydrous calcium sulfate, and stored under vacuum in a vessel with reduced transparency to actinic light. The temperature of storage is preferably low. This purified chloroform is used as a stock and is transferred as desired under controlled conditions, e.g., in the absence of sensitizers or desensitizers, to test vessels.

A test vessel, typically a small glass ampoule, is charged under high vacuum with a definite amount of chloroform purified and stored as set forth above. A known amount of sensitizer is added to the ampoule, either directly into the chloroform or separated therefrom by any suitable means such as a diaphragm, membrane, or by inclusion in separate smaller tube, such separation means being provided with means for its rupture, to permit mixing when desired. The system is sealed and is then ready for irradiation.

An "indicator," responsive to the products of irradiation, may be added internally, or the extent of reaction may be determined by conventional and well-known analysis for reaction products, after opening the ampoule subsequent to irradiation. Since such reaction products vary with the nature of the system, and are discussed at length in the literature, an extensive disclosure of analytical techniques will not be made here. Indicators, must, of course, be compatible with the system.

A few specific examples of experiments are given below.

Samples for irradiation were prepared as follows:

The chloroform container was connected through the stopcock to a vacuum line and the contents frozen by chilling the container in liquid $N_2$. Air was then pumped from the container by opening the stopcock to the vacuum line. After closing the stopcock the container was disconnected from the vacuum line.

Following evacuation, the flask was connected to a vacuum manifold provided with additional outlets to which sample ampoules and an oxygen source were connected. The manifold and ampoules were evacuated and the vacuum control cock turned off so as to preserve a vacuum in the system. Then, $CHCl_3$ was distilled from the said container into the ampoules by cooling the ampoules. Oxygen was then admitted to the desired pressure, the ampoule cooled with Dry Ice and sealed off with a flame. About 1 cc. of $CHCl_3$ was usually employed.

Such ampoules were irradiated with gamma rays by being placed about 2½ inches from a 15 curie $Co^{60}$ source. Samples prepared in the above manner show a reproducibility equivalent to less than ±4% while materials purified by other methods yield results reproducible to only about ±20%.

Following irradiation, total chloride, total oxidizing agent and total acidity were determined on appropriate samples. Total chloride was determined by breaking the sealed ampoule in a glass-stopper graduate containing 5 cc. of 0.1 N NaOH and 0.1 cc. of 30% $H_2O_2$ to convert hypochlorite formed in the solution to chloride. After shaking, the contents were rinsed into a 25 cc. volumetric flask and diluted to that volume. The chloride ion present was determined by titrating aliquots with 0.010 N $AgNO_3$ with end points determined potentiometrically and corrected by titration of blank control samples.

Total acid, which represents all product species reacting with the NaOH added in excess as described above (under total chloride), was determined by back titration of aliquots of the diluted sample above. In this titration, 0.010 N HCl was employed and the back titration carried out to an end point of pH 5.0.

Total oxidizing agent was determined by breaking the sealed ampoules in a glass-stopper graduate containing 5–10 ml. of 0.6 M KI. After being thoroughly shaken, the contents were rinsed into an Erlenmeyer flask and the liberated iodine was titrated with 0.10 $Na_2S_2O_3$ using starch as an end point indicator. Oxidizing agent content is stable for at least 18 hours after irradiation.

Samples containing no oxygen were irradiated with as high as $10^7$ r. thereby producing only trace quantities of chloride ion; the product in this case being chiefly hexachloroethane. With oxygen present chlorine, hydrochloric acid, phosgene and oxidizing agent were formed. Total chloride and total acid closely parallel each other, and are linearly proportional to irradiation under the conditions employed herein. Total peroxide and total oxidizing agent (which may actually be the same thing under present conditions) are also parallel and linearly proportional to irradiation. Determination of chloride ion serves as a very accurate measure of decomposition of the $CHCl_3$ since it represents the sum of all chlorine species susceptible to hydrolysis.

The effect of reduced oxygen pressures may be noted. With greatly reduced pressures, equivalent to less than about $6 \times 10^{-5}$ moles of $O_2$ under the conditions noted, the linearity of the oxidizing agent and chloride ion output, respectively, is severely affected. Moreover, the oxygen content is the final limiting factor in output of oxidizing agent (as well as chloride) with very large irradiation values. Initial rates of formation are independent of the oxygen concentration; however, with low oxygen concentrations, a small variation in oxygen content will have a disproportionately large effect upon production of decomposition products.

Temperature of the irradiated system has a marked effect upon decomposition rate as indicated below:

| T., °C.: | Milliequivalents $Cl^-$/cc. $CHCl_3$ |
|---|---|
| −80 | $0.30 \times 10^{-2}$ |
| 0 | $1.25 \times 10^{-2}$ |
| 19 | $2.48 \times 10^{-2}$ |
| 21 | $2.56 \times 10^{-2}$ |

As applied to dosimetry, the excellent agreement between chloride ion, ioxidizing agent, and extent of irradiation suggests application in measuring dosages in excess of 1000 r., since the amounts of these materials produced could be determined by macro-analytical techniques. Micro-chemical techniques would be required below this level for estimation external to the system.

Irradiation of a system containing one cubic centimeter of chloroform and 0.014 millimole of oxygen yielded the following results:

| Dosage | Me.Cl⁻ (Produced) | cc. 0.010 N $AgNO_3$ |
|---|---|---|
| $10^5$ r | $4.5 \times 10^{-2}$ | 4.5 |
| $10^3$ r | $4.5 \times 10^{-4}$ | 0.045 |
| $10^2$ r | $4.5 \times 10^{-5}$ | 0.0045 |

If a material such as the leuco base of the dye, crystal violet, is used in the chloroform, it serves both as sensitizer and indicator, changing to the colored form when the chloroform is irradiated, in a reproducible and easily estimated manner. Protracted irradiation discharges the color by further reaction of fragments with the molecule of the dyestuff. Excessive exposures thus give rise to an appearance of "no exposure," but the violet color of the system is not generated when the exposure ampoule is broken and exposed to air—a simple distinction.

The general technique of using color-changing internal or external indicators, which may be sensitizers as well, is of course applicable. Obviously, the indicator must not perturb the system. The use of the leuco base of crystal violet, above is one example. Malachite green is another suitable material. Incidentally, such dye materials generaly require purification, e.g., by recrystallization, before use, as commercial materials are seldom of the high purity desirable in this application. Color may be formed or may be discharged as a result of the system's reaction to irradiation. Observation of the color change may be made visually, or by conventional colorimetric means.

If purified bromoform be used with the leuco base of crystal violet, a dosimeter useful in the range of 30 to 300 roentgens of gamma radiation can be made. Conventional purification techniques are applicable. The chloroform-leuco base system may be utilized readily for the 250 to 500 roentgen range. Such a pair of dosimeters thus enables coverage of the lower end of the range of radiation dosage of casualty interest in the event of atomic warfare, the mean lethal dosage being considered to be about 400 r. Dosimeters for higher ranges are easily made using, e.g., chloroform-oxygen systems with external estimation, or chlorinated hydrocarbon-leuco base systems using other materials such as tetrachloroethane or 1,1,2-trichloroethane.

What is claimed is:

1. A method for determining quantities of gamma radiation and X-radiation, comprising the steps of exposing to such radiation a mixture consisting of a quantity of a purified halogenated hydrocarbon chosen from the class consisting of chloroform, bromoform, tetrachloroethane and 1,1,2-trichloroethane and a minor quantity of an indicator-sensitizer selected from the class consisting of the leuco bases of crystal violet and malachite green, and measuring the changes in said mixture resulting from the decomposition of said halogenated hydrocarbon by said radiation.

2. A method for determining quantities of gamma radiation and X-radiation, comprising the steps of exposing to such radiation a mixture consisting of a quantity of a purified halogenated hydrocarbon chosen from the class consisting of chloroform, bromoform, tetrachloroethane and 1,1,2-trichlorethane and a minor quantity of an indicator-sensitizer chosen from the class consisting of the leuco bases of crystal violet and malachite green, and measuring the amount of decomposition produced in the sensitized halogenated hydrocarbon by said radiation.

3. The method of claim 2 wherein the chemical measurement step consists in determining the quantity of halogen decomposition products of the sensitized halogenated hydrocarbon.

4. The method of claim 2 wherein the chemical measurement step consists in determining the quantity of the oxidizing decomposition products of the sensitized halogenated hydrocarbon.

5. In a method for determining quantities of gamma radiation and X-radiation, the steps of exposing to such radiation a mixture consisting of a quantity of a purified halogenated hydrocarbon selected from the class consisting of chloroform, bromoform, tetrachloroethane and 1,1,2-trichloroethane and a minor quantity of an indicator-sensitizer chosen from the class consisting of the leuco bases of crystal violet and malachite green, and measuring colorimetrically the change in color produced in said leuco base by its reaction with the oxidizing decomposition products of said halogenated hydrocarbon resulting from said exposure to said radiation.

6. An apparatus for measuring quantities of gamma radiation and X-radiation, comprising a sealed inert container and a mixture consisting of a quantity of a purified halogenated hydrocarbon selected from the class consisting of chloroform, bromoform, tetrachloroethane and 1,1,2-trichloroethane and a minor quantity of an indicator-sensitizer selected from the class consisting of the leuco bases of crystal violet and malachite green, disposed in said container.

7. The apparatus of claim 6 to which is added colorimetric comparing means for determining the extent of the change in color of said leuco base as a result of its reaction with the oxidizing decomposition products of said halogenated hydrocarbon resulting from its exposure to gamma radiation or X-radiation.

References Cited in the file of this patent

UNITED STATES PATENTS

| 1,845,835 | Frankenburger et al. | Feb. 16, 1932 |
| 2,673,934 | Friedman | Mar. 30, 1954 |
| 2,700,736 | Roberts | Jan. 25, 1955 |
| 2,757,292 | Schulman | July 31, 1956 |
| 2,848,625 | Taplin et al. | Aug. 19, 1958 |

OTHER REFERENCES

Chemical Dosimetry of Iionizing Radiation, by Day et al., Nucleonics, February 1951, pp. 24–45.

A Colorimetric Dosimeter for Qualitative Measurement of Penetrating Radiation by Taplin et al., Radiology, April 1951, pages 577–591.

Sigoloff: "Fast-Neutron-Insensitive Chemical Gamma-Ray Dosimeter," Nucleonics, October 1956, pages 54 to 56.